United States Patent [19]

Maselko

[11] Patent Number: 4,841,900
[45] Date of Patent: Jun. 27, 1989

[54] COMBINED BOAT AND CARTOP CARRIER

[76] Inventor: Jerzy Maselko, 1202 Trace Dr., #101, Austin, Tex. 78741

[21] Appl. No.: 20,710

[22] Filed: Mar. 2, 1987

[51] Int. Cl.$^4$ ............................ B60R 9/04; B63B 7/04
[52] U.S. Cl. .................................. 114/353; 224/42.01; 114/352
[58] Field of Search ............................ 224/42.01, 309; 114/352, 353, 343

[56] References Cited

U.S. PATENT DOCUMENTS

| | | | |
|---|---|---|---|
| 1,527,089 | 2/1925 | Shipley | 114/353 |
| 1,560,983 | 11/1925 | Gibbs et al. | 114/353 |
| 2,489,705 | 11/1949 | Du Brie | 114/353 |
| 3,097,371 | 7/1963 | Rough | 114/353 |
| 3,684,139 | 8/1972 | Johnson | 114/353 |
| 4,478,167 | 10/1984 | Hart | 114/352 |
| 4,522,145 | 6/1985 | Stone | 114/352 |

FOREIGN PATENT DOCUMENTS 1084162  6/1960  Fed. Rep. of Germany ...... 114/353

Primary Examiner—Sherman D. Basinger
Assistant Examiner—Edwin L. Swinehart
Attorney, Agent, or Firm—Leon Gilden

[57] ABSTRACT

A boat is formed in two watertight sections which are hingedly connected together. The boat may be folded in half to form a cartop carrier.

1 Claim, 2 Drawing Sheets

COMBINED BOAT AND CARTOP CARRIER

BACKGROUND OF THE INVENTION

1. Field of the Invention

The present invention relates to boats, and more particularly pertains to a new and improved boat construction wherein said boat can be folded in half to form a cartop carrier.

2. Description of the Prior Art

The use of foldable boats is known in the prior art. An early example of a foldable boat is to be found in U.S. Pat. No. 1,527,089, which issued to C. Shipley on Feb. 17, 1925. The Shipley boat comprises a canoe that is formed in two halves which are hingedly attached together. When not being utilized as a boat, the halves can be folded one on top of the other to form a trailer for the storage or transporting of camping material and the like.

Other folding transportable boats which can also be utilized as storage containers are to be found in U.S. Pat. No. 1,658,500, which issued to J. Tewes on Feb. 7, 1928; U.S. Pat. No. 2,422,930, which issued to L. Rutledge on June 24, 1947; and U.S. Pat. No. 4,180,881, which issued to J. Speranza on Jan. 1, 1980. These latter folding transportable boats are also designed to be attached to or carried on a trailer which is attachable to the bumper hitch of a towing vehicle.

While all of these prior art foldable transportable boats are functional for their intended purposes, it will be noted that all of them require the use of a wheeled trailer which is attachable to a towing structure associated with a vehicle. As can be appreciated, many drivers are reluctant to utilize trailers and as such, such foldable boat construction would not be particularly attractive to them. Further, these prior art foldable boats are complex in design and difficult to manufacture due to the requirement for a towing trailer assembly, and accordingly there appears to be a continuing need for improved foldable transportable boats. In this respect, the present invention addresses this need.

SUMMARY OF THE INVENTION

In view of the foregoing disadvantages inherent in the known types of foldable transportable boats now present in the prior art, the present invention provides an improved foldable transportable boat construction wherein the same can be folded in half, when not being utilized as a boat, to thus form a cartop carrier which does not require the use of a towing trailer. As such, the general purpose of the present invention, which will be described subsequently in greater detail, is to provide a new and improved foldable transportable boat which has all the advantages of the prior art foldable transportable boats and none of the disadvantages.

To attain this, the present invention comprises a boat which is formed in two watertight sections which are hingedly attached together. When in an opened position, the boat halves form a conventional boat so as to provide a means of transportation for an individual over a body of water. When not being utilized as a boat, the two halves may be folded together to form a cartop carrier which may be mounted to a conventional rack attached to the top of a vehicle. Due to the sloping construction of the ends of the boat, the cartop carrier is provided with an efficient aerodynamic design.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes f the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved foldable transportable boat which has all the advantages of the prior art foldable transportable boats and none of the disadvantages.

It is another object of the present invention to provide a new and improved foldable transportable boat which may be easily and efficiently manufactured and marketed.

It is a further object of the present invention to provide a new and improved foldable transportable boat which is of a durable and reliable construction.

An even further object of the present invention is to provide a new and improved foldable transportable boat which is susceptible of a low cost of manufacture with regard to both materials and labor, and which accordingly is then susceptible of low prices of sale to the consuming public, thereby making such foldable transportable boats economically available to the buying public.

Still yet another object of the present invention is to provide a new and improved foldable transportable boat which provides in the apparatuses and methods of the prior art some of the advantages thereof, while simultaneously overcoming some of the disadvantages normally associated therewith.

Still another object of the present invention is to provide a new and improved foldable transportable boat which also functions as a cartop carrier.

Yet another object of the present invention is to provide a new and improved foldable transportable boat which may be utilized as a storage container while eliminating the need for a towing trailer structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an end elevation view of the boat shown in FIG. 1.

DESCRIPTION OF THE PREFERRED EMBODIMENT

Figure 1:
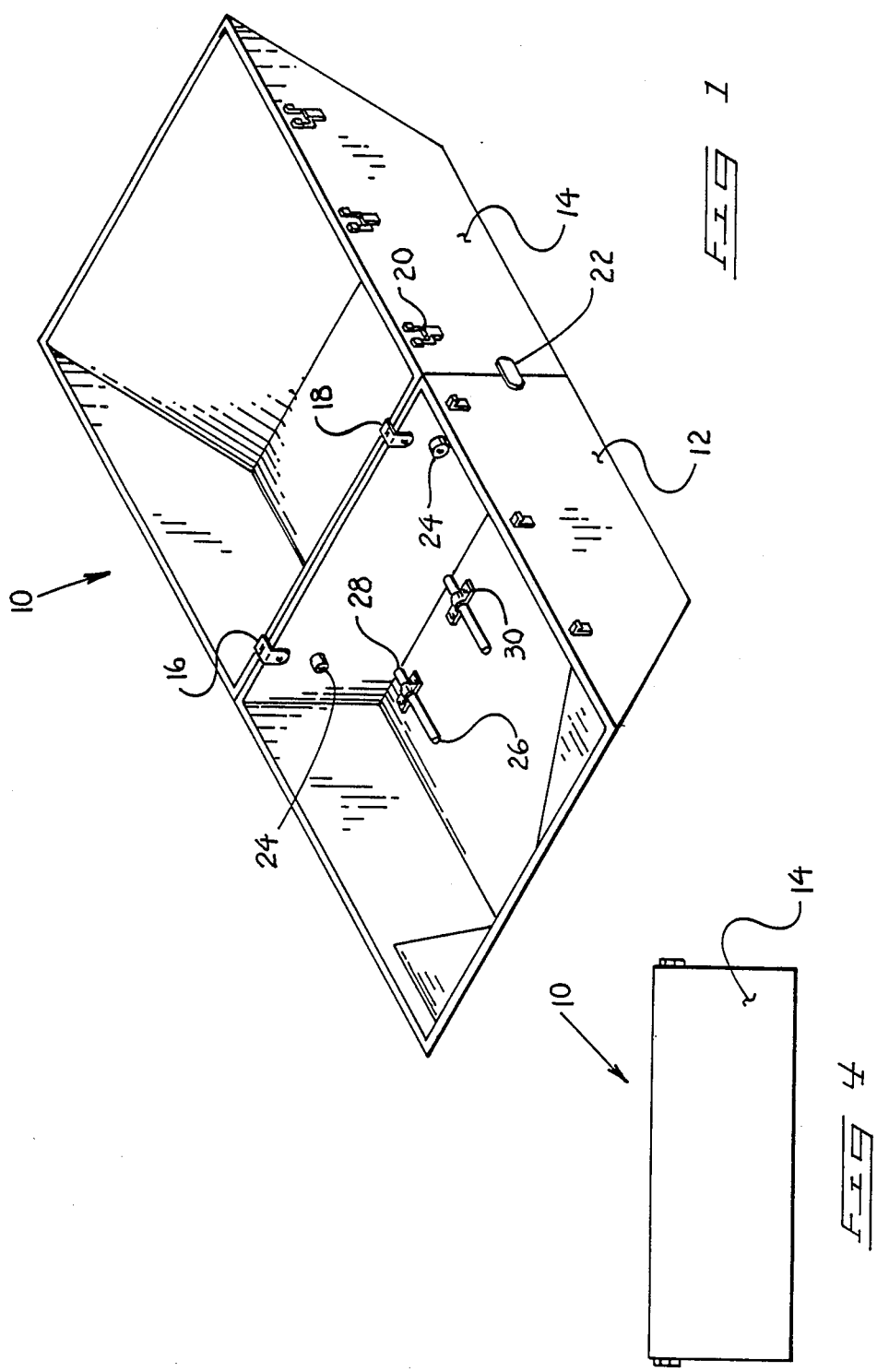
FIG. 1 is a perspective view of the foldable transportable boat and cartop carrier comprising the present invention.

With reference now to the drawings, and in particular to FIGS. 1, 2, 3 and 4 thereof, a new and improved foldable transportable boat embodying the principles and concepts of the present invention and generally designated by the reference numeral 10 will be described.

More specifically it will be noted that the boat 10 includes first and second separate watertight halves 12, 14 which are hingedly connected together by a pair of hinges 16, 18. A plurality of conventional snap assemblies, generally designated by the reference numeral 20, are provided on the two halves 12, 14 with these snap assemblies being attachable together in the manner illustrated in FIG. 3 when the two halves are folded one on top of the other.

Figure 2:
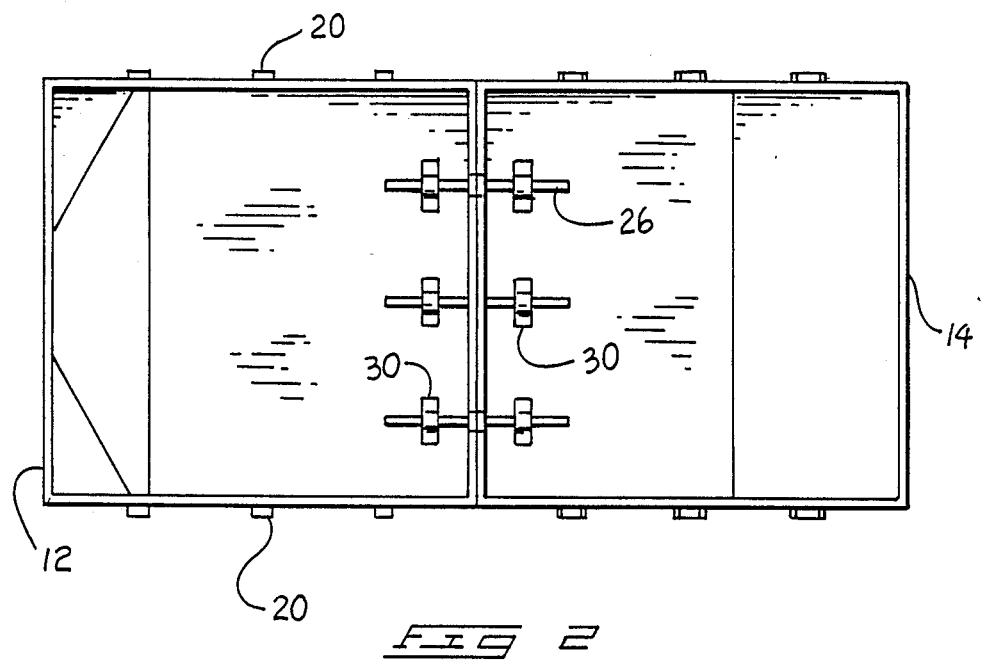
FIG. 2 is a top plan view of the boat.

When in its extended open position as best illustrated in FIGS. 1 and 2, the boat 10 may be prevented from folding movement through the use of a plurality of different fastener means. For example, an external surface of the boat 10 may include an additional snap assembly 22 which operates to prevent relative movement between the two halves 12, 14. A further attachment means utilizable to prevent relative movement between the two halves 12, 14 when in their extended open position includes the use of threaded fasteners 24 extensible through aligned apertures in the halves.

Recognizing the need for additional rigidity or rapidity of assembly of the two halves 12, 14, a further attachment means comprises the use of a plurality of stiffener rods 26 which may be quickly slidably positioned through aligned apertures 28 formed in the boat halves 12, 14. The apertures 28 could be lined with a rubber gasket, or the like, to prevent water leakage, and the rods 26 could be guidingly positioned between the two boat halves 12, 14 through the use of guide clamps 30. The guide clamps 30 would be fixedly secured to the respective floor portions of the boat halves 12, 14. If desired, the rods 26 could be replaced with wires attachable between clamps or other structure in the boat halves 12, 14, and all such attachment structures which would prevent relative movement between the boat halves is within the intent and purview of the present invention.

Figure 3:
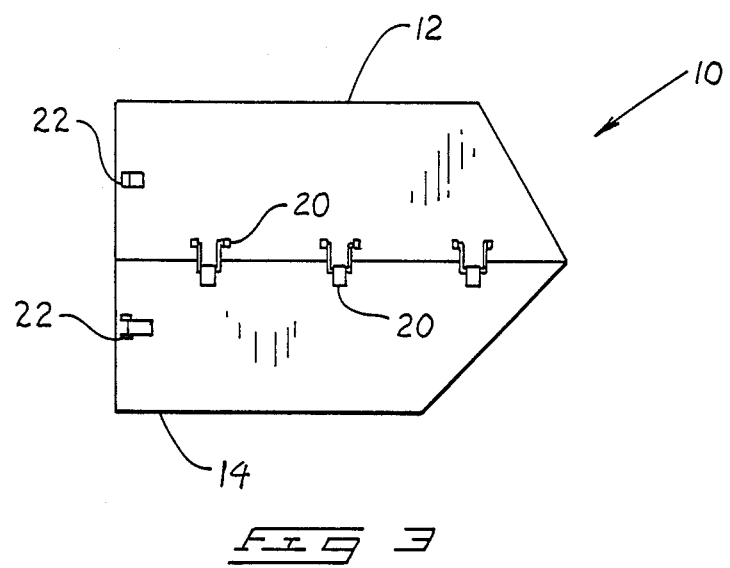
FIG. 3 is a side elevation view of the boat showing the same folded in half.

As to the manner of usage and operation of the present invention, the same should be apparent from the above description. However, a brief summary thereof will be provided. More specifically, when the boat 10 is in an open position as illustrated in FIG. 1, it provides for a rigid and watertight means of allowing individuals to traverse a body of water. When it is desired to collapse the boat into a storage container as shown in FIG. 3, one or all of the various attachment means 22, 24, 26 may be released, depending on which ones are used, and the hinges 16, 18 then permit the boat to be folded in half to form a cartop carrier. The snap assemblies 20 retain the boat in its folded collapsed position, and the cartop carrier thus formed may then be conventionally attached to the top of a vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved foldable transportable boat and cartop carrier comprising:

boat means including first and second watertight boat sections hingedly attached together, thereby to permit relative movement therebetween; said first and second boat sections being movable into a first position to form a boat and into a second position to form a cartop carrier;

first connection means for securing said first and second boat sections in said first position including a plurality of threaded fasteners securable between said first and second boat section positioned remotely from a boat floor formed in said first and second sections, said first connection means further including stiffening means comprising at least first and second slidable rods slidably secured to said boat floor in said first and second sections positionable through alinged aperatures in said first and second boat section when said boat is in said first position;

said stiffening means further including rigid bracket means to slidingly accept each of said slidable rods comprising a first plurality of rigid brackets slidingly accepting the first slidable rod therethrough when said boat is in said first position wherein said first plurality of brackets are directly secured to said boat floor with at least one bracket of said first plurality of rigid brackets secured in each of said first and second boat sections, and a second plurality of rigid brackets slidingly accepting the second slidable rod therethrough when said boat is in said first position wherein said second plurality of brackets are directly secured to said boat floor with at least one bracket of said second plurality of rigid brackets secure in each of said first and second boat sections; said first and second plurality of rigid brackets configured to maintain said respective first and second slidable rods in contact with said bracket means and said boat floor when said first and second slidable rods are positioned through respective of said first and second plurality of brackets, and second connection means for securing said first and second boat sections in said second position comprising at least one manually operable snap assembly positioned proximate a defined periphery of said first and second actions.

* * * * *